Patented Mar. 12, 1929.

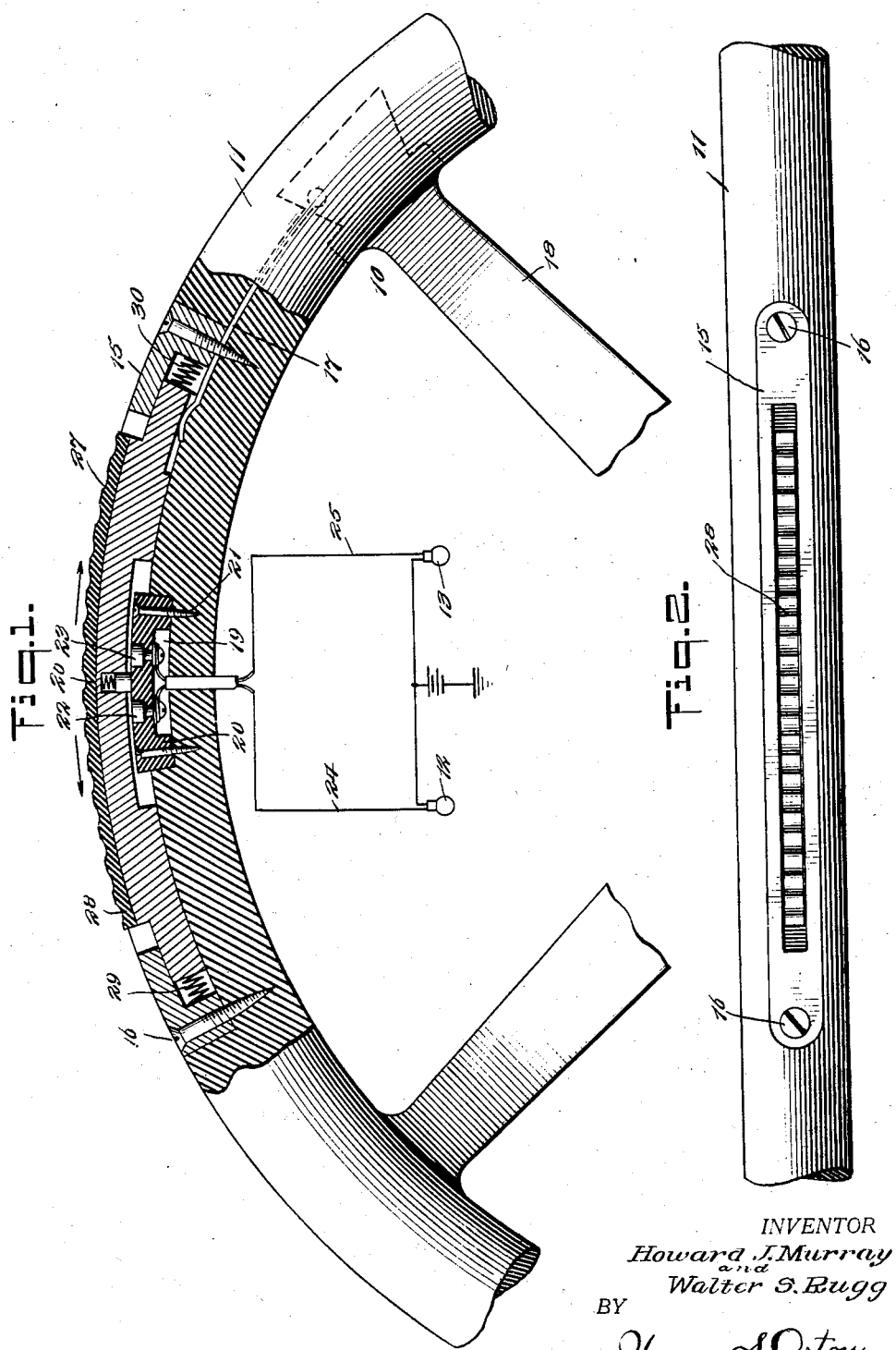

1,704,710

UNITED STATES PATENT OFFICE.

HOWARD J. MURRAY, OF BROOKLYN, NEW YORK, AND WALTER S. RUGG, OF PITTSBURGH, PENNSYLVANIA, ASSIGNORS TO R. M. COMPANY, INC., OF EAST PITTSBURGH, PENNSYLVANIA, A CORPORATION OF DELAWARE.

DIRECTION INDICATOR FOR AUTOMOBILES.

Application filed April 25, 1923. Serial No. 634,620.

The invention relates to a signalling device of the type commonly found on automotive vehicles for the purpose of indicating the intent of the operator to turn to the right or left and the invention specifically relates to an improved form of manual control for such indicators, or still more specifically defined the invention relates to a circuit closer constituting a unit designed to be mounted on a steering wheel as a part thereof.

In the usual form of automobile rear signalling devices two different means for controlling the signals or indicators are in use. With one form of control the setting of the right or left signal is effected independently of the steering mechanism, usually by a selective operation of control buttons or of a switch and this is particularly true in those cases where the indicator is electrically actuated or controlled.

This type of mechanism obviously requires two distinct operations, a signalling operation and a steering operation. However, it frequently happens that the operator inadvertently makes an error, indicates the wrong signal, or may even change his mind between the signalling and the steering operations, thus giving the warned person the wrong indication of the movement of the vehicle.

With the other type of such indicators, the control is connected mechanically to the steering mechanism to cause the signalling to take place automatically by the actuation of the steering mechanism. In this case it is obvious that the signal is not given until the car has actually started to turn in the indicated direction and under such circumstances a signal is of little, if any, value for it is given too late to be of use to the operator in the following vehicle. Even in the case where the signal is given automatically a wrong signal is apt to be given for the vehicle might be guided to swerve sharply in one direction, such for instance, as to the right, immediately preceding the intended turn to the left and as the steering mechanism must pass through neutral before it can actuate the left turning indicating signal the warned person will be advised that the vehicle is about to turn to the right when as a matter of fact, the real turning movement is a movement to the left.

Accordingly, the primary object of the invention is to provide a simple form of indicator control which will be operatively associated with the steering mechanism in such way as to give a pre-indication of the succeeding movement of the vehicle as an incident to the steering operation.

Differently stated, an object of the invention is to provide a right and left direction indicator so connected to the steering mechanism of a vehicle that the operator in the single act of steering the vehicle in one or the other directions will cause the proper signal to function automatically and immediately preceding the steering operation and without necessary conscious effort on the part of the operator to give such signal.

Another object of the invention is to provide a direction indicator which will be at all times under the conscious control of the operator so that he can regulate the time delay between the giving of the signal and the actual turning of the vehicle and in this way it is the intent to provide a structure which will be either automatic in its operation incidental to the steering operation or which may be selectively controlled independent of any succeeding steering operation.

A further object of the invention is to provide a signal control of the type outlined which will cause the signal to become inactive immediately upon the release of the holding tension of the operator in effecting the steering and without necessity of the steering mechanism pass through or even towards its neutral position.

Still another object of the invention is to provide a direction control mechanism which can be readily installed in the conventional forms of steering wheels now in general use in automotive vehicles and which will be neat in appearance and tend to maintain the general appearance of such wheels.

An incidental object of the invention is to provide a manually actuated control member, such as a circuit closer, which can be installed on the steering wheel or handle and which can be easily seen by the operator in the dark.

Various other objects and advantages of the invention will be in part obvious from an inspection of the accompanying drawings and in part will be more fully set forth in the following particular description of one form of mechanism embodying my invention, and the invention also consists in certain new and novel features of construction and combination of parts hereinafter set forth and claimed.

In the accompanying drawings:—

Figure 1 is largely a view of a portion of the automotive vehicle steering wheel with parts broken away, equipped with a preferred embodiment of the invention and also showing diagrammatically a signalling device with necessary electrical connections; and Figure 2 is a plan view looking at the outer edge of the wheel when viewing the same from the upper side of Figure 1.

In the following description and in the claims, parts will be identified by specific names for convenience of expression but they are intended to be as generic in their application to similar parts as the art will permit.

In the drawings there is shown part of a steering wheel 10 which may be considered symbolically as a vehicle steering mechanism. The wheel includes the usual rim portion 11 which is designed to be gripped in the act of steering the vehicle and which hand gripping part will be referred to hereinafter as the handle. It will be further assumed that the associated vehicle is provided with some suitable form of direction indicators, herein shown to be of an electrically actuated type, and controlled selectively by a circuit closer mounted on the steering wheel or handle. There is shown diagrammatically in the drawings a left indicating signal 12; a right indicating signal 13 supplied from one side of a source of energy 14, the other side of which source is grounded on the machine together with the necessary electric conductors.

Referring specifically to the controlling circuit closer specifically constituting the feature of this disclosure, it is intended that the same be marketed as a unit designed for installation on any form of steering handle simply by mortising out the part of the handle to accomodate the unit.

In the showing in Figure 1 a portion of the handle 11 which is usually grasped by the operator in steering the vehicle, is recessed on its outer edge and a combined guiding block and face plate 15 is fitted in the recess and secured thereto by end screws 16. One of these screws may be conveniently utilized for securing in place an electric conductor 17 for grounding one side of the circuit closer on a metallic part of the vehicle, herein indicated symbolically by one of the metal spokes 18.

Centrally positioned in a countersunk part 19 of the recess in the handle is a block 20 of insulating material, demountably secured in place by screws 21. The block is provided with two electric contacts 22 and 23 spaced apart circumferentially of the direction of movement of the wheel in effecting its steering action. One of the contacts 22 is connected through a lead 24 with the signal 12 and the other contact 23 is similarly connected through a lead 25 with the signal 13. These contacts constitute the relatively fixed members of a compound circuit closer, the movable element of which is in the form of a single spring pressed button 26 carried in a guideway formed on the underside of metallic control member 27, hereinafter identified as a grip. This grip is arched to conform to the configuration of the portion of the wheel containing the same, and is guided for longitudinal movement in the plate 15 so as to have a movement in the same general direction as the containing portion when steering the vehicle of the handle. The grip is provided on its outer side with a hand engaging face 28 which projects slightly beyond the outline of the plate 15 and is preferably roughened so as to be easily engaged by the operator's hand.

As a refinement of construction it is herein suggested that the outer face of this grip be coated or formed of some illuminous substance which will facilitate locating the same in the dark. Balanced springs 29 and 30 bear on opposite ends of the grip and tend, when the grip is released of the tension of the operator's hand, to restore the switch to its normal, inoperative position shown in Figure 1.

In operation and assuming first that the vehicle is being driven straight forwardly, then the parts are in the position shown in Figure 1, and neither of the indicating signals are functioning. Suppose that it is the intent of the operator to move in one or the other direction, such for instance, as a movement to the right. The operator will grasp the handle at the part containing the grip and which part will be preferably located at the point where the operator naturally grasps the wheel to effect the steering operation. As he moves his hand to the right to effect the steering movement the slight play permitted the grip will cause the same to move independently of the handle and to the right of the position shown in Figure 1. This slight shifting of the grip will bring the button 26 in circuit closing engagement with the contact 23 thus completing the circuit through the indicator 13 and cause the same to function. By this time the right hand spring 30 is compressed so that the shifted grip and the handle 11 constitutes, in effect, a rigid unyielding part of the steering mechanism.

It may be considered that the steering pressure from the operator's hand is transmitted directly through the handle 11 or to the handle through the grip and it is probable that the pressure acts both ways.

Releasing tension on the grip permits the spring 30 to react thereon to move the circuit closer to open position and thus automatically cause the right signal to become inoperative.

It is obvious that the corresponding action would occur in connection with the left indicator as an incident to the operator's action in effecting a steering movement to the left. This operation has been described under the assumption that the operator has not given any particular attention to the fact that he was operating a signalling control device and that the proper signal was caused to function automatically and incidental to the steering operation. It is, of course, obvious however, that the operator may intentionally engage the grip, shift the same gently to the right or left depending upon the car movement which he intends to effect later and in this way cause the signal to function independently of and in any desired time relation to the succeeding steering movement.

By means of a device of the type disclosed it is possible to give the proper directional signal as an incident to the steering operation before the steering operation has actually commenced and in this way a sufficient time interval is attained to warn the operator of a vehicle in rear and to give this rearly positioned operator a correct indication of the movement which the vehicle equipped with this device is about to take.

While we have shown and described, and have pointed out in the annexed claims, certain novel features of our invention, it will be understood that various omissions, substitutions and changes in the form and details of the device illustrated and in its operation may be made by those skilled in the art without departing from the spirit of the invention.

Having thus described our invention, we claim:

1. In a device of the class described, the combination with a vehicle steering mechanism including a wheel handle bodily movable in opposite directions to effect a steering of the vehicle to the right or left as desired, of a grip mounted on the handle, having a length considered circumferentially of approximately the width of a person's hand thus forming a hand engaging part and designed to move in the directions in which manual force is to be applied to the handle to effect the desired steering, means for forming an electric circuit, said means including a two point circuit closer, said circuit closer being operably connected to the grip whereby a movement of the grip in one direction incidental to the act of inaugurating the steering operation will cause the circuit to be closed through one of the points and a corresponding movement in the opposite direction will cause the other circuit to be closed through the other point.

2. In a vehicle steering mechanism, a steering wheel having a rim with a part of the portion designed to be grasped by the operator's hand having a limited freedom of motion relative to the other part in a direction circumferential of the rim, a circuit closer operatively controlled by the movement of said part of the steering handle and balancing springs housed within the outlines of the rim acting on said movable part and tending normally to restore the circuit closer to an inoperative position.

3. In a vehicle, the combination of a steering mechanism, a circuit closer, a manually actuated control therefor, a control for the steering mechanism, a spring disposed between the controls and tending normally to maintain them separated from each other, a part of said steering mechanism control disposed in the path of movement of the circuit closer control whereby actuating force exerted on the manually actuated control will shift the same first into operative position and then following the compression of said spring; movable into pressing engagement with the steering control to cause the same to function with a time interval between the closing of the circuit closer and the sequential shifting movement of the steering mechanism.

4. In a vehicle, the combination of a steering mechanism, including a wheel rim, and a normally inoperative and manually actuated control operatively carried by the rim, said control including a hand grip extending beyond the outlines of the rim fixed against movement radially of the rim and otherwise yieldingly mounted relative to other parts of the control, said hand grip being responsive to the initial movement of the operator's hand in effecting a steering operation to cause the same to function incidental to the act of steering the vehicle.

5. In a device of the class described, the combination of a steering mechanism including a steering handle, a circuit closer provided with a controlling handle having a limited freedom of movement relative to the steering handle, said controlling handle operatively connected to the steering handle and movable in one direction with an initial idling movement, then with a movement to cause the circuit closer to become active and finally to act on the steering handle to move the same.

6. In a vehicle, the combination of a steering wheel rim, a manually actuated control elongated circumferentially of the rim and movable longitudinally in opposite directions into operative positions to affect mechanism controlled thereby, said control being positioned in the path of movement of the operator's hand in effecting the usual movement of the steering wheel to cause the vehicle to turn towards the right or left, whereby the operator in the act of steering the vehicle will incidentally and without necessity of conscious effect selectively cause said mechanism to function automatically.

7. In a vehicle, the combination of a steering wheel rim, a manually actuated control positioned adjacent the part of the rim which is gripped by the operator in the act of steering the vehicle and constituting a material portion of the rim and said control positioned in the path of movement of said wheel whereby the control can be readily found without necessity of looking at the wheel rim.

8. In a vehicle, the combination of a steering wheel rim, a sliding, manually actuated control, said control carried by the steering wheel, guided thereon in fixed relation to the axis of the wheel and having a hand grip positioned in the path of the operator's hand to cause the same to function incidental to the movement of the operator's hand in the act of effecting a steering of the vehicle.

9. In a device of the class described, the combination with a steering wheel rim, a compound circuit closer, a curved shifting block constituting the movable element of the circuit closer carried on the rim and provided with a hand grip extending beyond the rim in position to be grasped by the operator's hand in the act of turning the steering wheel, said block guided for movement longitudinally in opposite directions substantially concentric with the periphery of the rim and operatively connected to close circuits at opposite ends of its path of movement.

10. In a device of the class described, the combination with a steering wheel rim, a curved hand grip movable on the rim substantially concentric with the periphery of the rim and projecting slightly beyond the rim, the periphery of the rim being otherwise free of outwardly extending projections and mechanism controlled by the shifting of the grip relative to the rim.

11. In a device of the class described, the combination of a steering wheel rim, means for forming two electric circuits, a single compound circuit closer for controlling the circuits, the movable element of the circuit closer carried by the rim extending for approximately one-eighth of the circumference of the rim and movable relative to the rim in a direction substantially concentric with the periphery of the rim, and operatively disposed so that when one of the circuits is in circuit closing position the other is in circuit breaking position.

12. An automobile signal comprising signaling means for indicating a change in the direction of travel of an automobile, steering mechanism including a steering wheel, and means for operating said signaling means including a grip member mounted on the normal forward central point of the steering wheel rim and having limited movement relative to said rim in the direction of movement of the latter and operable by the initial movement of an operator's hand after grasping the rim in turning the wheel to turn the automobile.

13. An automobile signal comprising electrical signaling means for indicating a change in the direction of travel of an automobile, a circuit therefor, steering mechanism including a steering wheel, a circuit closer in said circuit and means for operating said circuit closer to actuate said signaling means including a grip member mounted on the normal forward central point of the steering wheel rim and having limited movement relative to said rim in the direction of movement of the latter and operable by the initial movement of an operator's hand after grasping the rim in turning the wheel to turn the automobile.

This specification signed this 21st day of April, 1923.

HOWARD J. MURRAY.

This specification signed this 21st day of April, 1923.

WALTER S. RUGG.